April 21, 1953
J. A. GREGOIRE
2,635,924
WHEEL AND BRAKE DRUM FOR AUTOMOBILES
AND THE LIKE VEHICLES
Filed April 2, 1946
2 SHEETS—SHEET 1
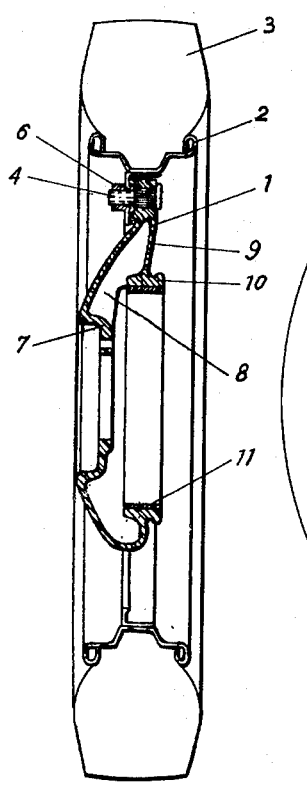
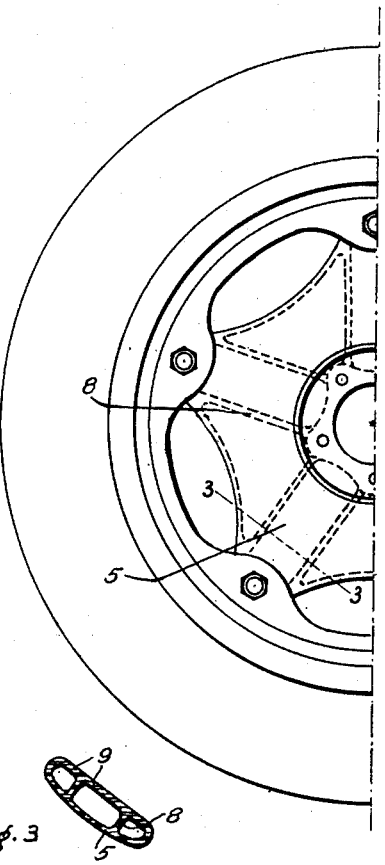
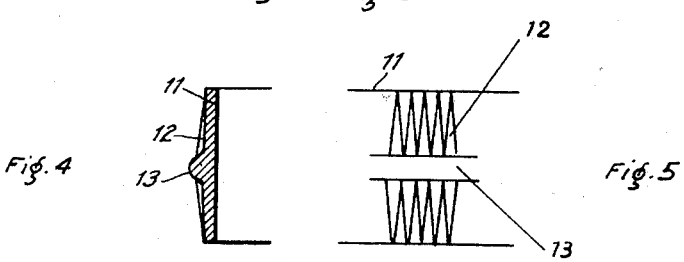
Inventor
Jean Albert Gregoire.
By
Jewett & Mead Attorneys April 21, 1953          J. A. GREGOIRE          2,635,924
WHEEL AND BRAKE DRUM FOR AUTOMOBILES
AND THE LIKE VEHICLES
Filed April 2, 1946          2 SHEETS—SHEET 2

Inventor
Jean Albert Gregoire
By Jewett & Mead
Attorneys

Patented Apr. 21, 1953

2,635,924

UNITED STATES PATENT OFFICE 2,635,924

WHEEL AND BRAKE DRUM FOR AUTOMOBILES AND THE LIKE VEHICLES

Jean Albert Grégoire, Paris, France

Application April 2, 1946, Serial No. 659,007
In France March 10, 1943

Section 1, Public Law 690, August 8, 1946
Patent expires March 10, 1963

3 Claims. (Cl. 301—6)

My invention covers an improved wheel for vehicles incorporating a brake drum.

A primary object of the invention consists in preventing any warping of this arrangement and this is achieved by providing round the outer periphery of a ring member surrounding the brake drum and in the medial plane of said ring and brake drum an annular rib that is rigidly connected with the wheel body in a manner such that the said medial plane coincides with the medial plane of the wheel and rim.

According to a preferred embodiment of the invention, said rib extends outwardly in the shape of a web that may be bolted to the rim or to the body of the wheel the hub portion of which is shifted laterally with reference to the medial plane considered and is connected with the web through ribs arranged in radial planes of the wheel.

Further features of my invention will appear in the following description referring to accompanying drawings illustrating diagrammatically by way of example and by no means in a limitative sense preferred forms of execution of my invention.

Fig. 1 illustrates cross-sectionally a system of a wheel with its brake drum according to my invention.

Fig. 2 is a corresponding half-elevational view.

Fig. 3 is a cross-section through line III—III of Fig. 2.

Fig. 4 is a cross-section on a larger scale of the brake drum.

Fig. 5 is a corresponding view from above.

Figure 6:
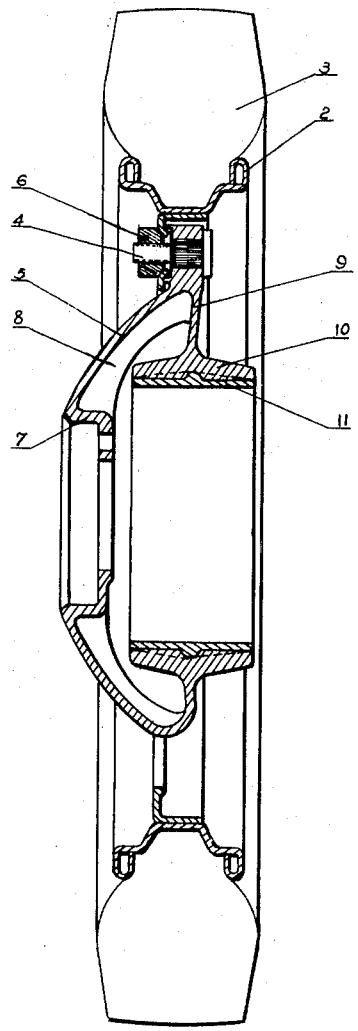
Figs. 6 and 7 are cross-sectional views of modifications of said arrangement.

In all said figures, the same reference numbers illustrate corresponding elements. Reverting to Fig. 1, it is apparent that the wheel is constituted by two elements, to wit: the wheel body proper 1 and the rim 2 which carries in the usual manner the tire 3. The wheel body is of cast aluminium alloy and has the shape illustrated. The rim 2 is bolted to the body 1 through the bolts 4. This rim may be of any desired type and may be made of welded and riveted sheets of steel or like metal or even of a chill cast light metal in order to avoid any machining; this arrangement of a wheel formed of two parts, a rim and a wheel body has in particular the advantage of allowing the spare wheel to be done away with and to be replaced by a simple spare rim which allows a reduction in the weight to be transported.

The actual wheel body 1 includes a number of tubular spokes 5 (Figs. 2 and 3) that are bent into arcuate shape in radial planes and are rigid with the hub 7. The bolts 4 already referred to serve for bolting the rim 2 to the outer ends of said spokes; the stems of said bolts are knurled and tightly fitted to prevent them from rotating and from axially sliding. These bolts provide for the centering and securing of the ring through cooperation with the nuts 6. Radially directed ribs 8 extend on the inside of the spokes to improve the rigidity of the wheel.

The wheel body comprising the hub 7, the spokes 5 and the ribs 8 includes furthermore an annular web 9 extending in the medial plane of the rim on the inside of the outer end of the spokes and rigid with the corresponding ends of the radial ribs 8. These different members 5, 7, 8 and 9 are cast in one to form the wheel body made of a light aluminium alloy, for instance.

The inner periphery of the web 9 carries coaxially a ring 10 extending symmetrically to either side of the medial plane of the rim; inside said ring 10 is rigidly fitted the brake drum 11; in fact, the wheel body including the ring 10 is preferably cast over the drum 11 of cast iron or the like metal, the connection between the two members being ensured through the small flutings 12 provided on the brake drum as illustrated in Fig. 5. The brake drum is also provided with a small peripheral medial rib 13 that prevents any lateral shifting of said drum with reference to the ring 10 (see also Fig. 4). It is apparent thus that the brake drum is held in its medial plane which is also the medial plane of the whole wheel structure through the web 9 that may also be considered as a ribbing at the outer periphery of the brake-carrying ring 10.

The advantages of the arrangement disclosed consists firstly in that, the wheel and the drum being in a single part, the bore of the drum may be perfectly coaxial with that of the wheel which is to receive directly the hub. Moreover, there is no risk of the drum warping when the wheel is being fitted as in the case of certain mountings in which the drum is held fast between the hub and the wheel.

Moreover as concerns the brake drum, the rigidity of the system is obtained by means of the annular web 9 which lies perpendicularly to the drum and is connected therewith substantially through the middle of its breadth. This annular web plays the part of an extremely rigid hoop which is continuous throughout the periphery of the drum. The fact that it is located towards the middle of the breadth of the drum is very important. As a matter of fact, if the web were to lie near one edge of the drum, the heat developed in the braking would expand the drum irregularly into the shape of a cone and waves might even be produced if ribs perpendicular to the disc were provided as reinforcing means throughout its breadth.

Lastly the arrangement of the wheel and drum system allows the rapid elimination of the heat evolved throughout the wheel, by reason of the ventilation provided between the spokes of the wheel.

In the modification illustrated in Fig. 6 the brake drum 11 has a diameter which is comparatively small and its breadth is comparatively considerable.

In this case it has been ascertained that it is preferable in conformity with my invention to use instead of a rib, rigidly securing the arm or spoke 5 with the ring 10 a narrower rib 8 which is provided throughout the length of the arm 5 and is rigid only with the outer part of the annular web 9. This arrangement has for its object to prevent the broad brake drum from being submitted to lateral bending stresses and consequent deformation.

It should be borne in mind moreover that such deformations are must less important and are often negligible in practice in the cases where the breadth of the brake drum is small with reference to its diameter.

Figure 7:
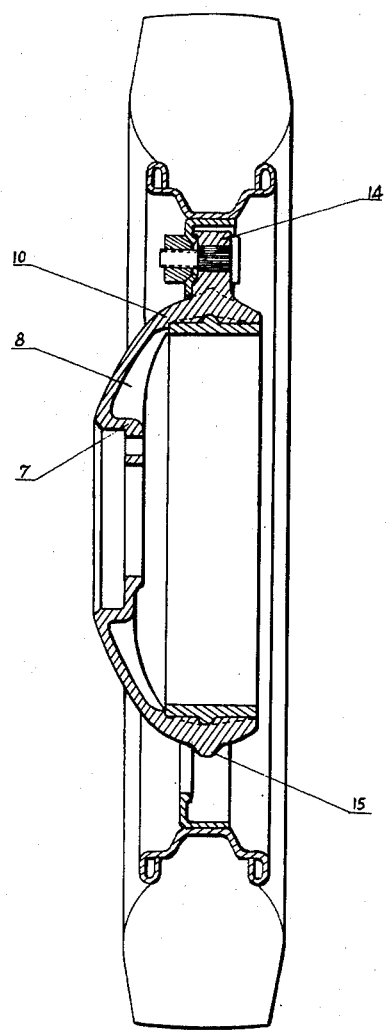

In Fig. 7 I have illustrated a wheel including a brake drum of large diameter with reference to the rim. In this case the annular web 9 connecting the brake drum with the lugs 14 carrying the rim securing studs or bolts 14 is replaced by a mere rib 15 at the outer periphery of the ring 10, said rib lying in the medial plane thereof. Such a rib 15 produces a hoop action on the brake drum and prevents any deformation of the drum between the bolts 14 engaging radial projections on the ring to secure it to the rim; at the same time, the ribs 8 associated with the spokes 5 engage directly the edge of the ring facing the hub and merge into the ring and rib system 10—15.

Obviously many modifications may be brought to the above mentioned arrangement without widening thereby the scope of my invention.

What I claim is:

1. A wheel and brake unit comprising a cast iron brake drum and a wheel body of light alloy cast over same and including a ring member coaxially cast over the drum fitted therein, a flat peripheral web rigid with the outer periphery of the ring in the medial portion thereof, a hub coaxial with said ring and laterally shifted with reference thereto, spokes connecting said hub with the outer periphery of the web, reinforcing radial ribs on the inside of said spokes and rigid with the corresponding portions of the web and a rim bolted to the outer periphery of the web and spoke structure.

2. A wheel and brake drum unit comprising a wheel body of cast light alloy including a hub, spokes integral therewith, an annular web integral with the outer ends of the spokes and lying in a plane on the outside of the hub, a ring coaxially integral with the inner periphery of the web and the medial plane of which passes through said web, a plurality of radial ribs integral with the inside of the spokes, the cooperating portion of the hub and with a section of the web and ring structure and extending throughout the radial length of said structure, a rim secured to the outer periphery of the spoke and web structure and the medial plane of which registers with the web and a brake drum fitted inside the ring.

3. A wheel and brake drum unit comprising a wheel body of cast light alloy including an annular web, a hub integral therewith and lying in a plane on the outside of the web, and a ring integral with the inner periphery of the web, coaxial with the hub, and extending to either side of said web by equal distances, a plurality of radial ribs integral with the outer portion of the web and extending up to the hub, a rim carried by the outer periphery of the wheel body and the medial plane of which registers with the web and a brake drum fitted inside the ring.

JEAN ALBERT GRÉGOIRE.

References Cited in the file of this patent

UNITED STATES PATENTS

| Number | Name | Date |
| --- | --- | --- |
| 1,375,717 | Moore | Apr. 26, 1921 |
| 1,566,344 | Perrott | Dec. 22, 1925 |
| 1,727,486 | Sauzedde | Sept. 10, 1929 |
| 1,750,682 | Nelson | Mar. 18, 1930 |
| 1,990,746 | Nelson | Feb. 12, 1935 |
| 2,016,435 | Isidin | Oct. 8, 1935 |
| 2,019,109 | Ash | Oct. 29, 1935 |

FOREIGN PATENTS

| Number | Country | Date |
| --- | --- | --- |
| 473,132 | Great Britain | Oct. 1, 1937 |
| 545,776 | France | 1922 |